US012717688B2

(12) United States Patent
Passmore et al.

(10) Patent No.: US 12,717,688 B2
(45) Date of Patent: Aug. 25, 2026

(54) DATA RECOVERY VALIDATION TEST

(71) Applicant: State Farm Mutual Automobile Insurance Company, Bloomington, IL (US)

(72) Inventors: Victoria Michelle Passmore, Atlanta, GA (US); Cesar Bryan Acosta, Atlanta, GA (US); Christopher Chickoree, Atlanta, GA (US); Mason Davenport, Atlanta, GA (US); Ashish Desai, Suwanee, GA (US); Sudha Kalyanasundaram, Cumming, GA (US); Christopher R. Lay, Roswell, GA (US); Emre Ozgener, Anna, TX (US); Steven Stiles, Sandy Springs, GA (US); Andrew Warner, Atlanta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 6 days.

(21) Appl. No.: 18/817,649

(22) Filed: Aug. 28, 2024

(65) Prior Publication Data

US 2024/0427680 A1 Dec. 26, 2024

Related U.S. Application Data

(63) Continuation of application No. 18/072,589, filed on Nov. 30, 2022, now Pat. No. 12,105,607, which is a (Continued)

(51) Int. Cl.
*G06F 11/26* (2006.01)
*G06F 11/00* (2006.01)

(52) U.S. Cl.
CPC ............ *G06F 11/26* (2013.01); *G06F 11/004* (2013.01); *G06F 2201/805* (2013.01)

(58) Field of Classification Search
CPC ..... G06F 11/1446–1469; G06F 11/004; G06F 11/26; G06F 11/3688
See application file for complete search history.

(56) References Cited

U.S. PATENT DOCUMENTS 7,299,376 B2 11/2007 Kodi et al.
8,261,122 B1 9/2012 Kappel et al.
(Continued)

FOREIGN PATENT DOCUMENTS

CN 111580929 A 8/2020

OTHER PUBLICATIONS

Connectivity Testing with Ping, Telnet, Trace Route and NSlookup, Jun. 2013, 6 pgs.

(Continued)

*Primary Examiner* — Michael Maskulinski
(74) *Attorney, Agent, or Firm* — Lee & Hayes, P.C.

(57) ABSTRACT

Techniques are described for a data recovery validation test. In examples, a processor receives a command to be included in the validation test that is configured to validate performance of an activity by a server prior to a failure to perform the activity by the server. The processor stores the validation test including the command on a memory device, and prior to the failure of the activity by the server, executes the validation test including the command responsive to an input. The processor receives results of the validation test corresponding to the command and indicating whether the server performed the activity in accordance with a standard for the activity during the validation test. The processor provides the results of the validation test in a user interface.

20 Claims, 11 Drawing Sheets

Related U.S. Application Data continuation of application No. 17/326,123, filed on May 20, 2021, now Pat. No. 11,544,166.

(60) Provisional application No. 63/027,656, filed on May 20, 2020.

(56) References Cited

U.S. PATENT DOCUMENTS

| | | | |
|---|---|---|---|
| 8,676,762 | B2 | 3/2014 | Pafumi et al. |
| 8,924,792 | B2 | 12/2014 | Chavda et al. |
| 9,032,414 | B1 | 5/2015 | Dalal |
| 9,152,686 | B2 | 10/2015 | Whitehead et al. |
| 9,396,052 | B2 | 7/2016 | Sampath et al. |
| 9,396,071 | B1 | 7/2016 | Akanda et al. |
| 9,448,893 | B1 | 9/2016 | Whitehead et al. |
| 9,454,439 | B2 | 9/2016 | Martos et al. |
| 10,013,306 | B2 | 7/2018 | Umbehocker et al. |
| 10,055,305 | B2 | 8/2018 | Kaplingat et al. |
| 10,198,284 | B2 | 2/2019 | Ali et al. |
| 10,275,346 | B2 | 4/2019 | Boshev et al. |
| 10,402,301 | B2 | 9/2019 | Qadri et al. |
| 10,595,204 | B2 | 3/2020 | Greer |
| 10,684,791 | B2 | 6/2020 | Ashokkumar et al. |
| 10,776,271 | B2 | 9/2020 | Chen et al. |
| 10,802,920 | B2 | 10/2020 | Stowell et al. |
| 11,544,166 | B1 | 1/2023 | Passmore et al. |
| 2008/0271025 | A1 | 10/2008 | Gross et al. |
| 2009/0210427 | A1 | 8/2009 | Eidler et al. |
| 2010/0077257 | A1 | 3/2010 | Burchfield et al. |
| 2013/0326279 | A1 | 12/2013 | Chavda et al. |
| 2014/0351644 | A1 | 11/2014 | Garg et al. |
| 2015/0220411 | A1 | 8/2015 | Shivanna |
| 2021/0049083 | A1 | 2/2021 | Yakushkin et al. |
| 2021/0318935 | A1 | 10/2021 | Jacobs et al. |
| 2023/0092076 | A1 | 3/2023 | Passmore |

OTHER PUBLICATIONS

How to Tell if your Data Backup is Working, Optimal Networks, Inc, Aug. 2015, 4 pgs.

Office Action for U.S. Appl. No. 18/072,589, mailed on Jan. 25, 2024, Passmore, “Data Recovery Validation Test”, 21 pages.

Office Action for U.S. Appl. No. 17/326,123, mailed on 120/7/2021, Passmore, “Data Recovery Validation Test”, 21 Pages.

Office Action for U.S. Appl. No. 17/326,123, mailed on May 5, 2022, Passmore, “Data Recovery Validation Test”, 18 pages.

Office Action for U.S. Appl. No. 18/072,589, mailed on Sep. 13, 2023, Passmore, “Data Recovery Validation Test”, 16 pages.

Figure 5:
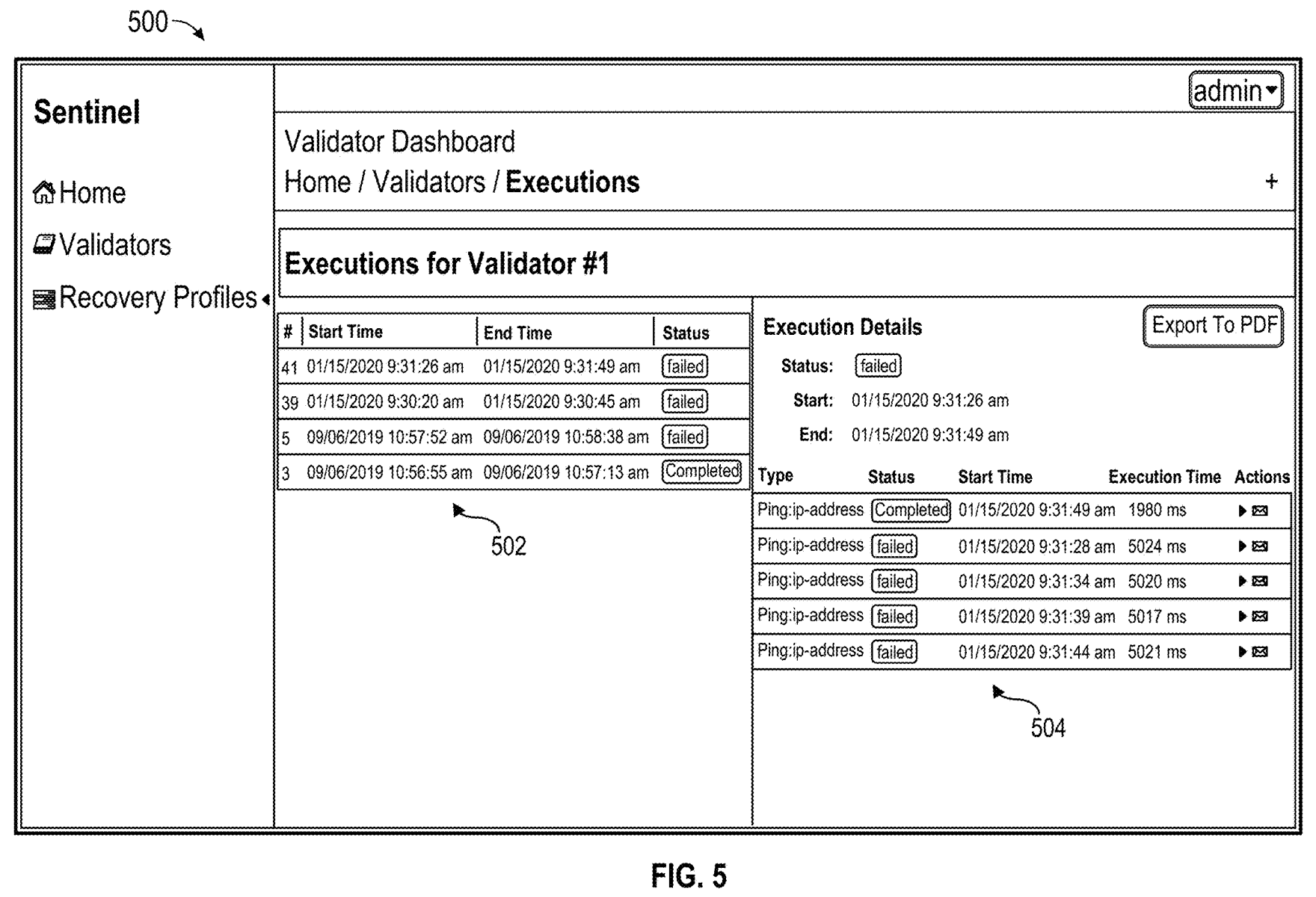

500

Sentinel

Home

Validators

Recovery Profiles admin

Validator Dashboard

Home / Validators / Executions

+

Executions for Validator #1

| # | Start Time | End Time | Status |
|---|---|---|---|
| 41 | 01/15/2020 9:31:26 am | 01/15/2020 9:31:49 am | failed |
| 39 | 01/15/2020 9:30:20 am | 01/15/2020 9:30:45 am | failed |
| 5 | 09/06/2019 10:57:52 am | 09/06/2019 10:58:38 am | failed |
| 3 | 09/06/2019 10:56:55 am | 09/06/2019 10:57:13 am | Completed |

502

Execution Details

Export To PDF

Status: failed

Start: 01/15/2020 9:31:26 am

End: 01/15/2020 9:31:49 am

| Type | Status | Start Time | Execution Time | Actions |
|---|---|---|---|---|
| Ping:ip-address | Completed | 01/15/2020 9:31:49 am | 1980 ms | |
| Ping:ip-address | failed | 01/15/2020 9:31:28 am | 5024 ms | |
| Ping:ip-address | failed | 01/15/2020 9:31:34 am | 5020 ms | |
| Ping:ip-address | failed | 01/15/2020 9:31:39 am | 5017 ms | |
| Ping:ip-address | failed | 01/15/2020 9:31:44 am | 5021 ms | |

DATA RECOVERY VALIDATION TEST

RELATED APPLICATIONS

This patent application is a continuation of and claims priority to U.S. patent application Ser. No. 18/072,589, filed on Nov. 30, 2022, which is a continuation of and claims priority to U.S. patent application Ser. No. 17/326,123, filed on May 20, 2021, which claims priority to U.S. Provisional Patent Application No. 63/027,656, filed May 20, 2020, and entitled "Data Recovery Validation Test," the entirety of which is hereby incorporated by reference.

BACKGROUND

Data backup is becoming increasingly important as more and more businesses move operations and information to digital forms. Generally, data backup includes the process of generating a copy of computer data, and storing the copy in a different location than the primary storage location of the original data, so that the data in the secondary location may be used to restore the original data after a data loss event. To ensure that data is backed up properly, and that the data is accessible once it has been backed up, a computer data manager may perform a validation operation to test the reliability of the data backup. However, creation and execution of such validation operations is typically slow and time consuming. Specifically, conventional systems require the data manager to "start from scratch" to create and/or locate scripts to run as part of the validation operation each time the manager desires to execute a validation operation, demanding substantial time and resources on behalf of the manager.

SUMMARY

In an example of the present disclosure, a method includes receiving, by a processor and from a first computing device associated with a first user account, a command to be included in a validation test, the validation test being configured to validate performance of an activity by a servers prior to a failure to perform the activity by the server. In some examples, the method further includes receiving, by the processor prior to the failure of the activity by the server and from the first computing device or a second computing device associated with a second user account, an input indicative of a request to execute the validation test, wherein the second user account is associated with the first user account. In some examples, the method further includes executing, by the processor and based at least in part on the input, the validation test including the command, wherein execution of the validation test by the processor produces a result: corresponding to the command, and indicating whether the server performed the activity, in accordance with a standard associated with the activity, during the validation test. In some examples, the method includes providing the result by the processor and via a user interface, to at least one of the first computing device or the second computing device.

In another example of the present disclosure, a system is configured to receive, from a first computing device associated with a first user account, a command to be included in a validation test, the validation test being configured to validate performance of an activity by a servers prior to a failure to perform the activity by the server. In some examples, the system is further configured to receive, prior to the failure of the activity by the server and from the first computing device or a second computing device associated with a second user account, an input indicative of a request to execute the validation test, wherein the second user account is associated with the first user account. In some examples, the system is further configured to execute, based at least in part on the input, the validation test including the command, wherein execution of the validation test by the processor produces a result: corresponding to the command, and indicating whether the server performed the activity, in accordance with a standard associated with the activity, during the validation test. In some examples, the system is further configured to provide the result via a user interface, to at least one of the first computing device or the second computing device.

In a further example of the present disclosure, a computer readable medium is configured to a system is configured to receive, from a first computing device associated with a first user account, a command to be included in a validation test, the validation test being configured to validate performance of an activity by a servers prior to a failure to perform the activity by the server. In some examples, the computer readable medium is further configured to receive, prior to the failure of the activity by the server and from the first computing device or a second computing device associated with a second user account, an input indicative of a request to execute the validation test, wherein the second user account is associated with the first user account. In some examples, the computer readable medium is further configured to execute, based at least in part on the input, the validation test including the command, wherein execution of the validation test by the processor produces a result: corresponding to the command, and indicating whether the server performed the activity, in accordance with a standard associated with the activity, during the validation test. In some examples, the computer readable medium is further configured to provide the result via a user interface, to at least one of the first computing device or the second computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 depicts a fourth example of a user interface corresponding to an execution report displayed after a validation test is complete, in accordance with examples of the disclosure.

DETAILED DESCRIPTION

Figure 1:
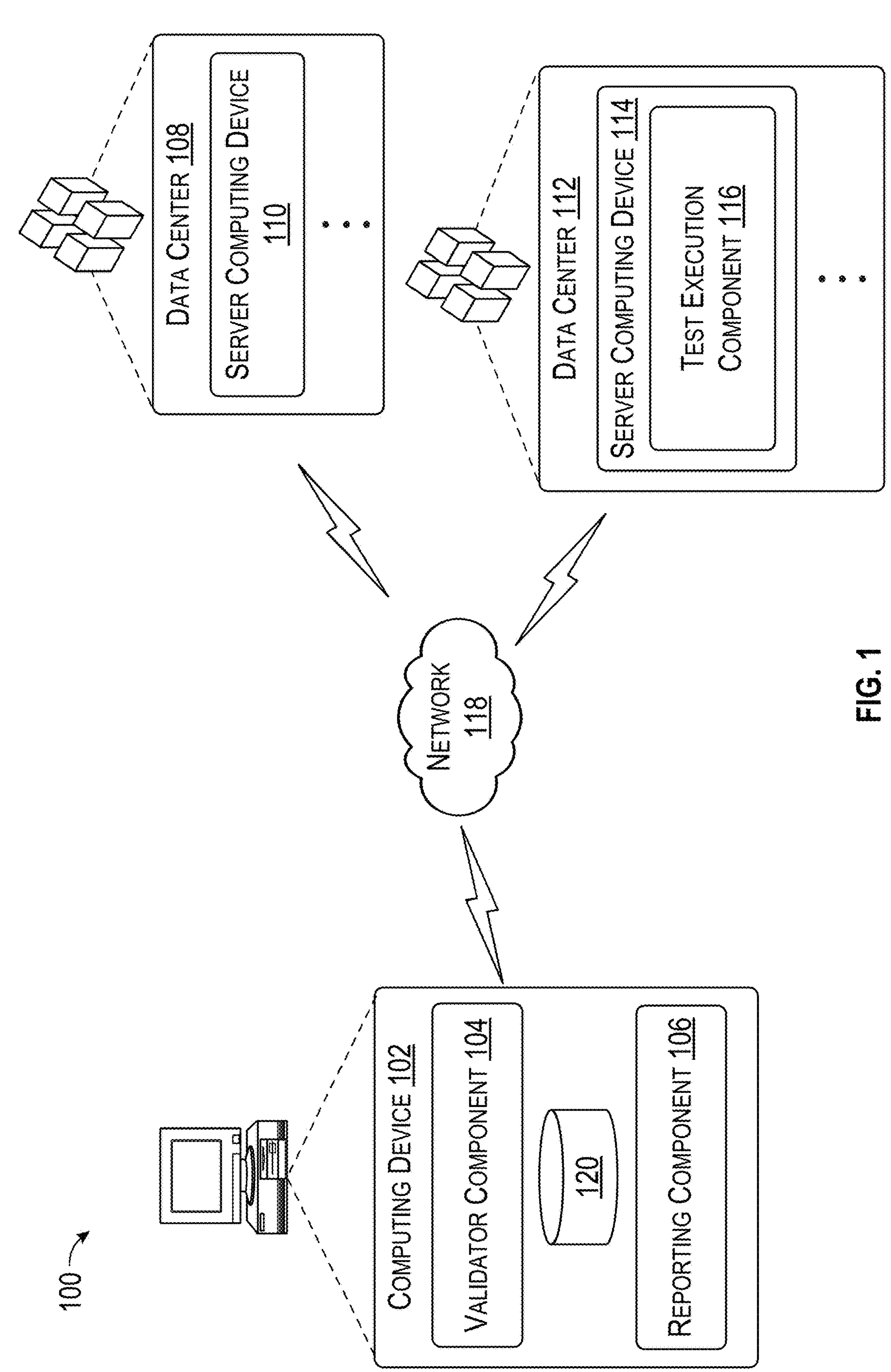
FIG. 1 is an example system for implementing a data recovery validation test, in accordance with examples of the disclosure.

Various examples of the present disclosure will be described in detail with reference to the drawings, wherein like reference numerals represent like parts and assemblies throughout the several views. Additionally, any examples set forth in this specification are not intended to be limiting and merely set forth some of the many possible examples.

FIG. 1 is an example system 100 for implementing a data recovery validation test, in accordance with examples of the disclosure. The example system 100 includes at least one computing device 102 comprising a validator component 104 and a reporting component 106, a data center 108 comprising one or more server computing devices 110, and a data center 112 comprising a server computing device 114 that includes a text execution component 116. The computing device 102, the data center 108, and the data center 112 may be in communication via a network 118. In some examples, the server computing device 112 may be a primary storage location for data associated with an enterprise, and the server computing device 110 may be a backup storage location for the data associated with the enterprise.

In examples, the computing device 102 may include a computing device such as a mobile phone, a tablet computer, a laptop computer, a desktop computer, and so forth which allows a person such as a server type owner (STO) to access data stored in the data center 108 and/or the data center 112. For instance, the computing device 102 is configured to enable the STO to run validation tests on the server computing device 110 and/or the server computing device 114 using the validator component 104. Alternatively or additionally, the reporting component of the computing device 102 provides a user interface which enables the STO to view results of a validation test while the validation test is being executed and/or when the validation test is complete, to name a few examples. The computing device 102 may include a processor, microprocessor, and/or other computing device components, shown and described below.

As shown and described herein, the data center 108 and/or the data center 112 may be comprised of one or more server computing devices, which may communicate with the computing device 102 and/or one another to respond to queries, receive data, and so forth. Communication between the server computing device 110 of the data center 108, the server computing device 114 of the data center 112, and/or the computing device 102 occurs via the network 118, where the communication can include commands to execute a validation test, instructions to backup data stored on the server computing device 110 and/or the server computing device 114, and the like. The server computing device 110 and/or the server computing device 114 can act on these requests from the computing device 102, determine one or more responses to those queries, and respond back to computing device 102. The server computing device 110 and/or the server computing device 114 may also include one or more processors, microprocessors, or other computing devices as discussed in more detail in relation to FIG. 11.

The server computing device 110 and/or the server computing device 114 may include one or more database systems storing different types of information. For example, a database can store correlations and algorithms used to manage data to be shared between the computing device 102, server computing device 110, and/or the server computing device 114. As discussed above, the server computing device 112 may be a primary storage location for data associated with an enterprise, and the server computing device 110 may be a backup storage location for the data associated with the enterprise. Accordingly, databases included in the server computing device 110 and/or the server computing device 114 may store algorithms configured to backup data originally stored on the server computing device 114 to the server computing device 110. Backup algorithms may include, for example, system imaging, incremental backup, Near-Continuous Data Protection (Near-CDP), reverse incremental, and differential backup methods, to name a few examples.

The network 118 is typically any type of wireless network or other communication network known in the art. Examples of the network 118 include the Internet, an intranet, a wide area network (WAN), a local area network (LAN), and a virtual private network (VPN), cellular network connections and connections made using protocols such as 802.11a, b, g, n and/or ac. a near-field communication network, a campus-area network (CAN), and/or an inter-area network (IAN).

In some examples, the validator component 104 of the computing device 102 is configured to provide a user interface to create, edit, and execute validation tests, where the validation tests identify whether data is being backed up from the server computing device 114 to the server computing device 110 properly. For instance, the validator component 104 receives one or more commands to be included in a validation test from a user (e.g., an STO) via the user interface at the computing device 102. Example commands may include a socket connection check, ping by IP address, ping by hostname, file directory check, nslookup, environment variable check, remote script, file content check, URL check, database check, reverse DNS check, and so forth. In examples, a socket connection check establishes a socket connection with a specific port on one of the server computing devices 110 and/or 114. A ping by IP address check and a ping by hostname check may comprise determining whether a specific IP address or hostname is online, respectively. A file directory check comprises programmatically determining whether a file or directory exists on a server. A nslookup determines whether a hostname is mapped by the default DNS server in a current environment. An environment variable check may include receiving an input from a user specifying an environment variable, and determining whether the environment variable exists. A remote script check enables a user to execute a script remotely by having the user specify a location of the script (e.g., on the server). A file content check determines contents of a file. A URL check performs a request to an internal enterprise URL to determine availability. A database check checks database connection by using hostname, port, database name, table name, and/or database type as inputs. A reverse DNS check enables a user to specify a domain name, and returns an associated IP address by querying the domain name system.

In some cases, the user includes a specific server (e.g., the server computing device 110 and/or the server computing device 114) on which the commands are to be executed. The commands included in the validation test validate performance of a corresponding activity by a server, such as prior to a server failure where the server fails to perform the activity. For example, a socket connection check command included in a validation test will determine whether the server computing device 114 has a live socket connection with the server computing device 110, prior to a failure of one of the servers. In some cases, the user may include a plurality of servers (e.g., 100 servers, 500 servers, 1000 servers, etc.) on which the commands are to be executed. In some examples, the user may upload a file identifying the one or more servers. In such examples, the validator component 104 may identify the plurality of servers based on the file.

In examples, the validator component 104 receives an input via the user interface to save the validation test including the command(s) included in the validation test. The validation component 104 then stores the validation test including the command(s) on a memory device 120 of the computing device 102. The validation component 104 has access to the memory device 120 to retrieve the validation test for later use. In this way, the STO does not need to recreate individual commands in the validation test from scratch each time the STO is requested to validate an activity of the server computing device 110 and/or the server computing device 114. Therefore, when the STO subsequently verifies a specific activity of the server computing device 110 and/or the server computing device 114, the command is preselected to be part of the validation test for future use. In some examples, once created, another STO (e.g., STO other than the creator of the validator) may execute the validation test generated by the STO. For example, a first STO may create a validation test to validate one or more server computing devices, such as server computing device 110, server computing device 114, and the like, and a second STO may execute the validation test.

Accordingly, bandwidth and memory requirements of a computing device are improved by reducing the amount of data sent over the network 118, where the described techniques reduce the number and/or frequency of individual validation operations to be executed on the server computing device 110 and/or the server computing device 114. For example, conventional techniques would require an STO to type in each URL into a browser to determine whether the corresponding server computing device loads as part of a URL check, resulting in large amounts of data being sent over the network 118. The described techniques, however, allow the STO to set up the validation test in advance and run all of the commands included in the validation test at once without having to leave the user interface of the validation component 104, thus reducing the amount of data sent over the network 118.

The validation component 104 enables an STO to update and make changes to a validation test as desired prior to a failure to perform an activity by the server. For example, the STO may access validation tests stored in the memory device 120 to edit commands stored in association with a particular validation test, add commands to the validation test, remove commands from the validation test, and so forth. In examples, the validation component 104 receives an edit associated with a command from an STO, such as to change from the server computing device 110 to the server computing device 114 to execute a reverse DNS check command. The validation component 104 generates an updated command based at least in part on the edit, and stores the validation test including the updated command in the memory device 120.

In some examples, the validation component 104 receives an input associated with the validation test prior to failure of the activity by the server computing device 110 and/or the server computing device 114. The input may correspond to a request by the STO to run the validation test on the server computing device 110 and/or the server computing device 114. The validation component 104 communicates the validation test to the test execution component 116 on the server computing device 114 via the network 118 in response to the request. The test execution component 116 receives the validation test, and executes the command(s) included in the validation test on the server computing device 114 and/or the server computing device 110. Although not explicitly pictured, the server computing device 110 may include a test execution component configured to execute validation tests as well. In cases where a command included in a validation test has been updated as described above, the test execution component 116 executes the validation test including the updated command (e.g., in place of the original command included in the validation test).

In some cases, the validation component 104 may require an STO requesting to access and/or perform a particular validation test to have certain permissions before the validation test is executed. For example, the validation test may be of a validation test type that requires a user account (e.g., associated with an STO) accessing the validation test to have permission to execute the validation test. In an example, a first STO may have permissions to execute validation tests on a subset of server computing devices or server types, while a second STO may have "administrative privileges" that allow the second STO to coordinate validation tests across multiple server computing devices or server types. While the first STO may not have privileges to execute validation tests on particular server computing devices, the second STO may have privileges to execute validation tests on all (or many) server computing devices. For another example, a first STO associated with a first team may generate a validation test and store the validation test in association with the first team. A second STO associated with the first team may access and perform the validation test stored in association with the first team.

The validation component 104 may receive an input from an STO associated with a scope of devices that the STO would like to perform the validation test on. The scope corresponds to a category of devices having a common characteristic. In examples, the common characteristic of the scope may indicate one or more of a business process run by the server computing device 110 and/or the server computing device 114, a geographic location of the data center 108 and/or the data center 112, an operating system run by the server computing device 110 and/or the server computing device 114, an asset type of devices to run the validation test on (e.g., servers, routers, modems, etc.), and the like. The validation component 104 determines that the server computing device 110 and/or the server computing device 114 are included in the scope before executing the validation test on these devices. In this way, the STO may designate which devices to execute the validation test on based on a group designation rather than requiring the STO to enumerate each device to be included in the validation test individually. In various examples, the STO may upload a file (e.g., CSV file, etc.) including data associated with each device to be included in the validation test.

The test execution component 116 transmits results of the requested validation test to the reporting component 106 of the computing device 102 via the network 118. In some examples, the results correspond to the command(s) included in the validation test. For instance, a validation test that includes a URL check command and a database check command causes the test execution component 116 to generate a URL check result and a database check result. Additionally, the result indicates whether the server computing device 110 and/or the server computing device 114 performed the activity corresponding to the command in accordance with a standard associated with the activity during the validation test. For example, an STO may run a URL check and receive a status code, where the status code may correspond to success or failure of the URL check, and/or a reason for success or failure of the URL check.

In some cases, the test execution component 116 monitors the validation test as the validation test is executed on the server computing device 110 and/or the server computing device 114. For example, the test execution component 116 may communicate results to the reporting component 106 of the computing device 102 in real time (or near real time) as the test execution component 116 executes the validation test. The reporting component 106 provides the results in real time (or near real time) in a user interface of the computing device 102 as the results are received from the test execution component 116. Alternatively or additionally, the test execution component 116 communicates results to the reporting component 106 responsive to the validation test being concluded. In some cases, the reporting component 106 generates a comprehensive report that includes the results of the validation test, and may include results of previously-executed validation tests as well. For instance, the reporting component 106 may include in the report aggregate statistics or trends associated with specific commands, such as aggregate statistics on a file content check based on physical locations of the server computing devices, trends corresponding to how a server computing device has responded to a remote script command over time, and so forth.

Figure 2:
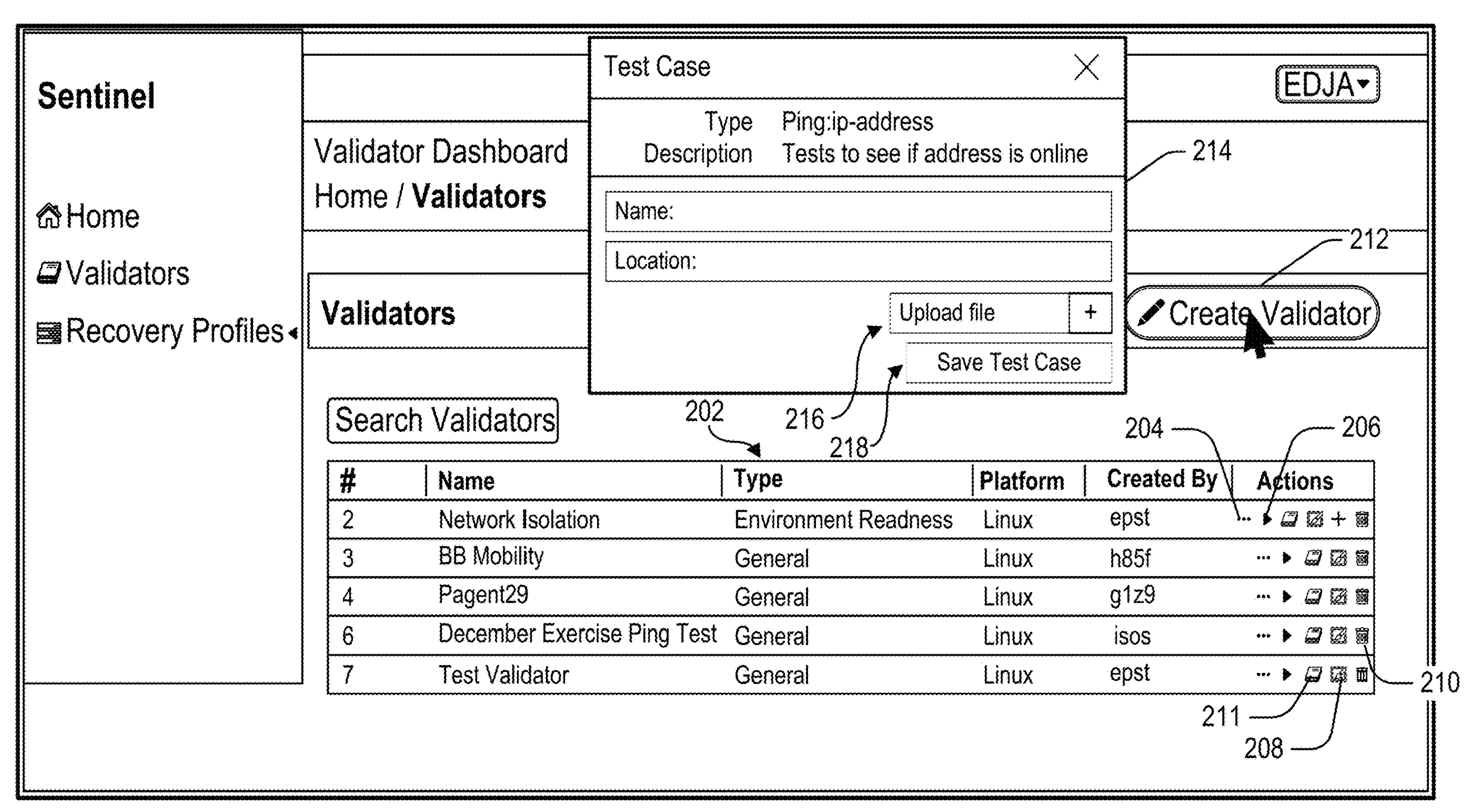
FIG. 2 depicts a first example of a user interface associated with a validator dashboard, in accordance with examples of the disclosure.

FIG. 2 depicts a first example of a user interface 200 associated with a validator dashboard, in accordance with examples of the disclosure. For example, the validator dashboard may be a user interface provided by the validator component 104 at the computing device 102. The user interface 200 includes validation tests 202 that were previously generated by an STO, or other user.

In some cases, which of the validation tests 202 displayed in the user interface 200 will depend upon a permission level of a user account operating in the validator component 104 on the computing device 102. For instance, as discussed above, an account associated with a first STO may have limited permissions, which causes the validation component 104 to provide validation tests in the user interface 200 that the first STO has created themselves using the account associated with the first STO. An account associated with a second STO may have more permissions than the account associated with the first STO, which may cause the validation component 104 to provide more validation tests in the user interface 200 than those provided to the first STO. For example, the second STO may be able to view validation tests from multiple different groups in the user interface 200 to ensure that an entire environment is ready for validation testing.

Along with the validation tests 202, the user interface 200 includes a control 204 that, when selected, enables the STO to view additional details about the selected validation test, such as individual commands included in the validation test. Additionally, the user interface 200 includes a control 206 that, when selected, enables the STO to run the selected validation test. Further, the user interface 200 includes a control 208 that, when selected, enables the STO to edit the selected validation test, such as by editing preselected commands included in the validation test. The user interface 200 also includes a control 210 that, when selected, causes the selected validation test to be deleted. In examples, the user interface 200 includes a control 211 that, when selected, enables the STO to view prior results of executions of the particular validation test. Each of the controls 204, 206, 208, and/or 210 may be provided in the user interface 200 for each of the validation tests 202. The user interface 200 may additionally include a control 212 that, when selected, enables the STO to create a new validation test to be added to the validation tests 202.

In various examples, responsive to receiving an indication of selection of the control 212, the validator component 104 may cause the window 214 to be presented via the user interface. Though illustrated as a window 214, this is not intended to be so limiting, and the data presented in association with the window 214 may be presented in a different page of the user interface 200, as a separate section of the validator dashboard, or the like. The window 214 may include an interface that enables the user to indicate one or more characteristics of a new validator (illustrated "test case"). In the illustrative example, the window 214 includes a type and description associated with the new validator. In some examples, the user may input the type information and subsequently, the validator component 104 may cause the description associated therewith to populate in the window.

In some examples, the window 214 may include a name input box in which the user may input a name to be associated with the new validation test. In some examples, the window 214 includes a location input box for the user to input a location associated with a particular IP address to be associated with the new validator. In some examples, the location input box may provide a means by which the user may input one or more specific IP addresses to be validated in the test case. In some examples, the window 214 may include a file upload option 216. In such examples, in response to receiving an indication of selection of the file upload option 216, the validator component 104 may receive an input associated with a particular file including an identification of one or more IP addresses and/or computing devices associated therewith, such as computing device 110 and/or computing device 114. As illustrated, the window 214 may include a save option 218, which may cause the validator component 104 to save the new test case based on the data input via the window 214. In response to receiving an indication of selection of the save option 218, the validator component 104 may cause the new test case to be presented in association with the validation tests 202.

Figure 3:
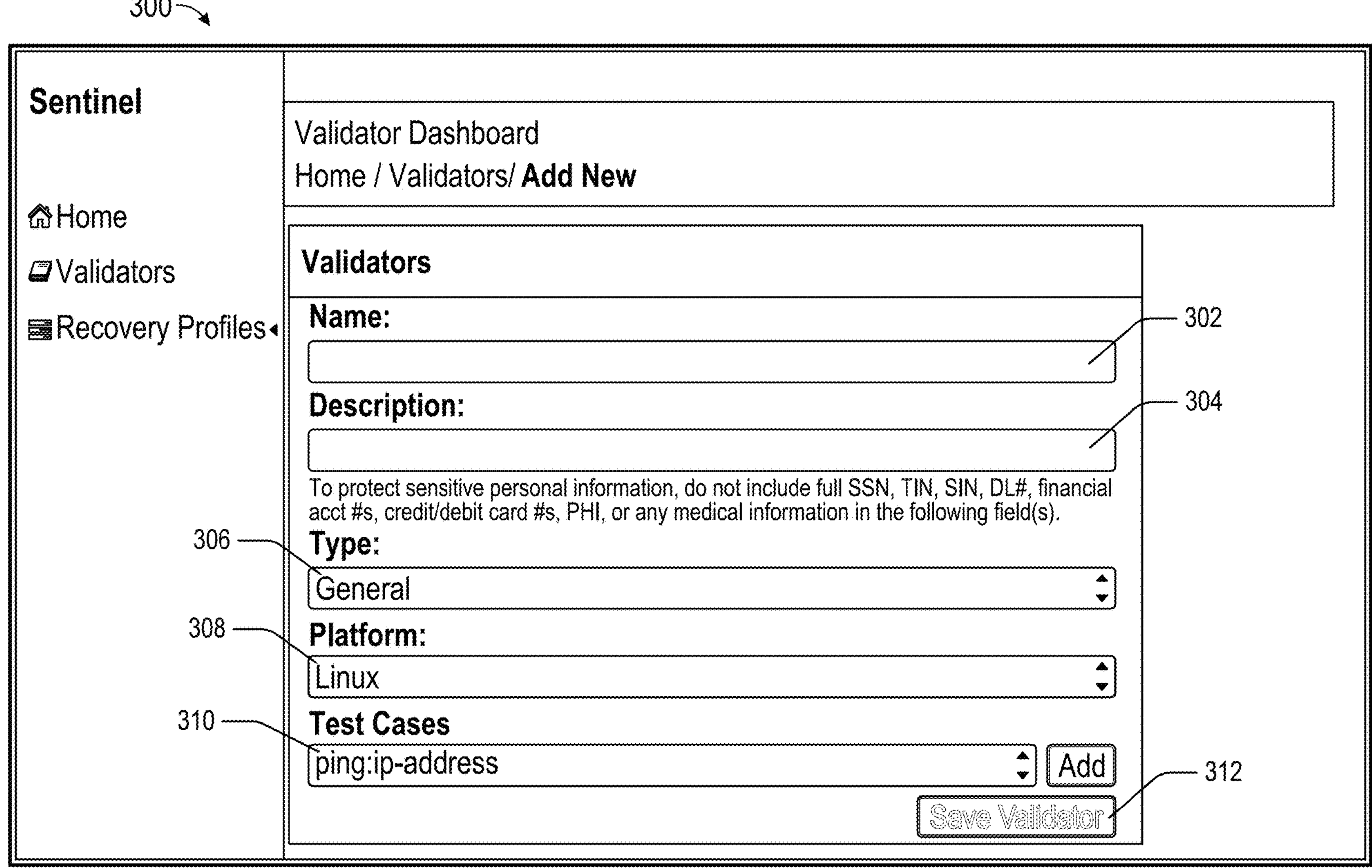
FIG. 3 depicts a second example of a user interface associated with creating a validation test, in accordance with examples of the disclosure.

FIG. 3 depicts a second example of a user interface 300 associated with creating a validation test, in accordance with examples of the disclosure. The validation component 104 may provide the user interface 300 in response to an STO selecting the control 212 to create a new validation test. The user interface 300 includes various prompts for the STO to complete to generate a validation test. For example, the user interface 300 includes a field 302 that enables the STO to input a name for the validation test and a field 304 that enables the STO to input a description for the validation test.

The user interface 300 may include a menu 306 that enables the STO to designate a type of server on which the validation test is to be performed, and a menu 308 that designates an operating system on which the validation test is to be performed. Selectable items included in the menus 306 and/or 308 may at least partially designate a scope of which computing devices are to execute the validation test, as described herein. Alternatively or additionally, the STO may add computing devices using other techniques to be included in the scope of the validation test, such as by geographic location, by uploading a CSV file that designates individual computing devices on which to execute the validation test, and so forth.

Additionally, the user interface 300 includes a menu 310 that enables the STO to select at least one command to be included in the validation test. As noted above, example commands that may be included in the menu 310 can be, but are not limited to, a socket connection check, ping by IP address, ping by hostname, file directory check, nslookup, environment variable check, remote script, file content check, URL check, database check, reverse DNS check, and so forth. Responsive to the STO selecting a control 312, the validation component 104 adds the validation test to the validation tests 202 displayed in the user interface 200.

Figure 4:
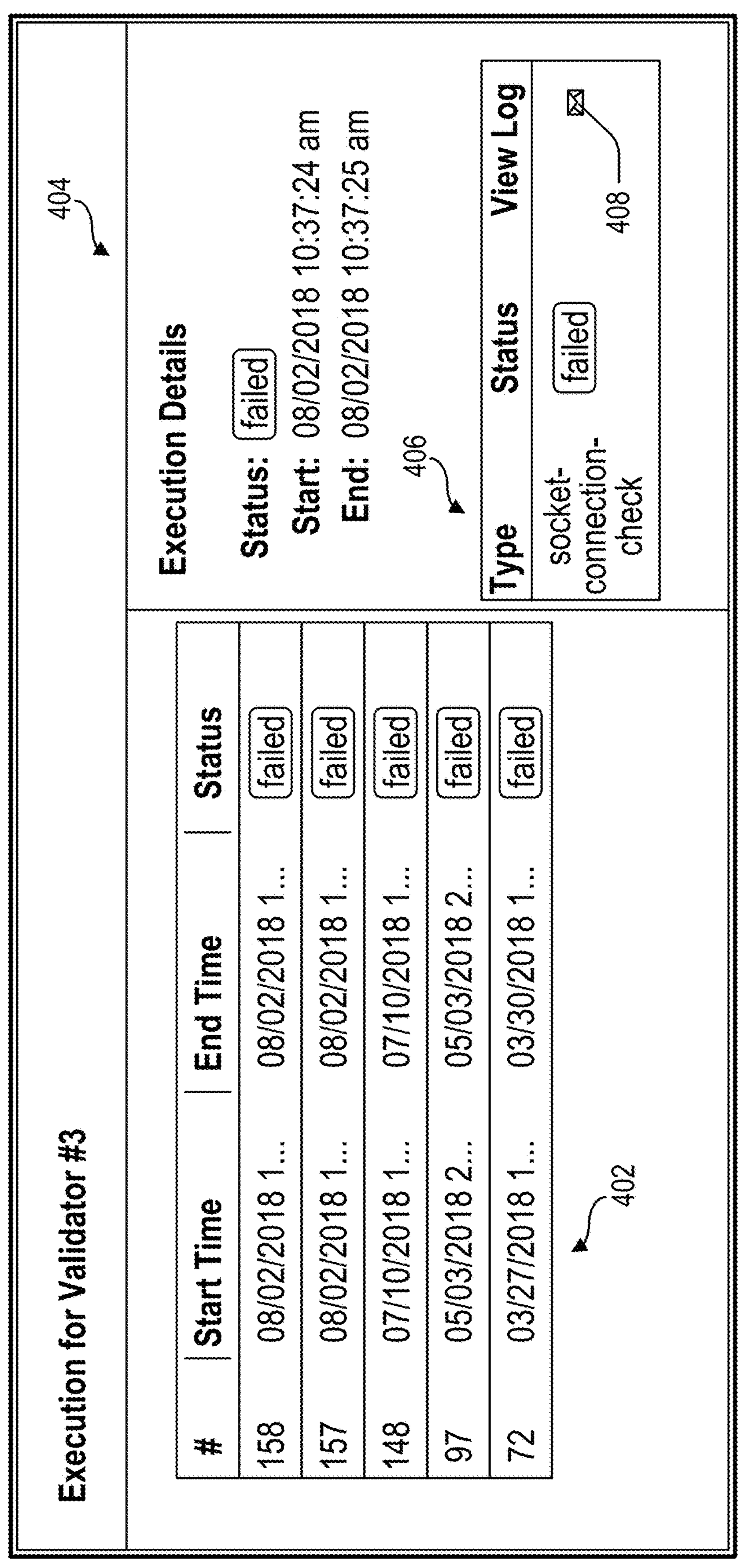
FIG. 4 depicts a third example of a user interface corresponding to an execution report displayed while a validation test is taking place, in accordance with examples of the disclosure.

FIG. 4 depicts a third example of a user interface 400 corresponding to an execution report displayed while a validation test is taking place, in accordance with examples of the disclosure. In some examples, the reporting component 106 provides the user interface 400 in response to the STO selecting the control 206 of FIG. 2 to execute a particular validation test. The user interface 400 includes results 402 corresponding to whether a server computing device performed according to a standard for a particular command, along with previous start times and end times at which the validation test was executed. In some cases, the respective results 402 may be selectable by the STO, causing the reporting component 106 to provide additional information about the specific execution of the prior validation test.

The user interface 400 also includes a portion 404 providing details on the validation test currently being executed by the test execution component 116, and/or a most recent validation test executed by the test execution component 116. In some examples, if one or more of the commands executed by the server computing device 110 and/or the server computing device 114 fail to perform to a standard associated with the command, then a status for the overall validation test will fail. However, examples are considered in which the overall status of the validation test will pass despite the server computing device 110 and/or the server computing device 114 failing to perform at the standard.

The user interface 400 includes a list 406 of the commands included in the validation test as well. If more than one command was included in the validation test, the list 406 may indicate which of the commands failed or successfully performed according to the standard associated with the individual commands. Further, the list 406 may include a control 408 that, when selected, provides additional information on errors that may have cause the server computing device to not perform to the standard, troubleshooting techniques for remedying the failure, and so forth.

FIG. 5 depicts a fourth example of a user interface 500 corresponding to an execution report displayed after a validation test is complete, in accordance with examples of the disclosure. For example, the reporting component 106 may provide the user interface 500 in response to the STO selecting the control 211 in the user interface 200 to view prior results of executions of a particular validation test. The user interface 500 includes a list 502 of instances that the particular validation test selected from the validation tests 202 was executed, including dates and times of the validation tests, and whether the server computing device passed the commands included in the validation test during the prior validation test execution. Additionally, the user interface 500 includes a portion 504 providing additional details on specific commands that were included in the prior validation test, and which of activities the server computing device performed according to a standard associated with individual commands included in the validation test.

Figure 6:
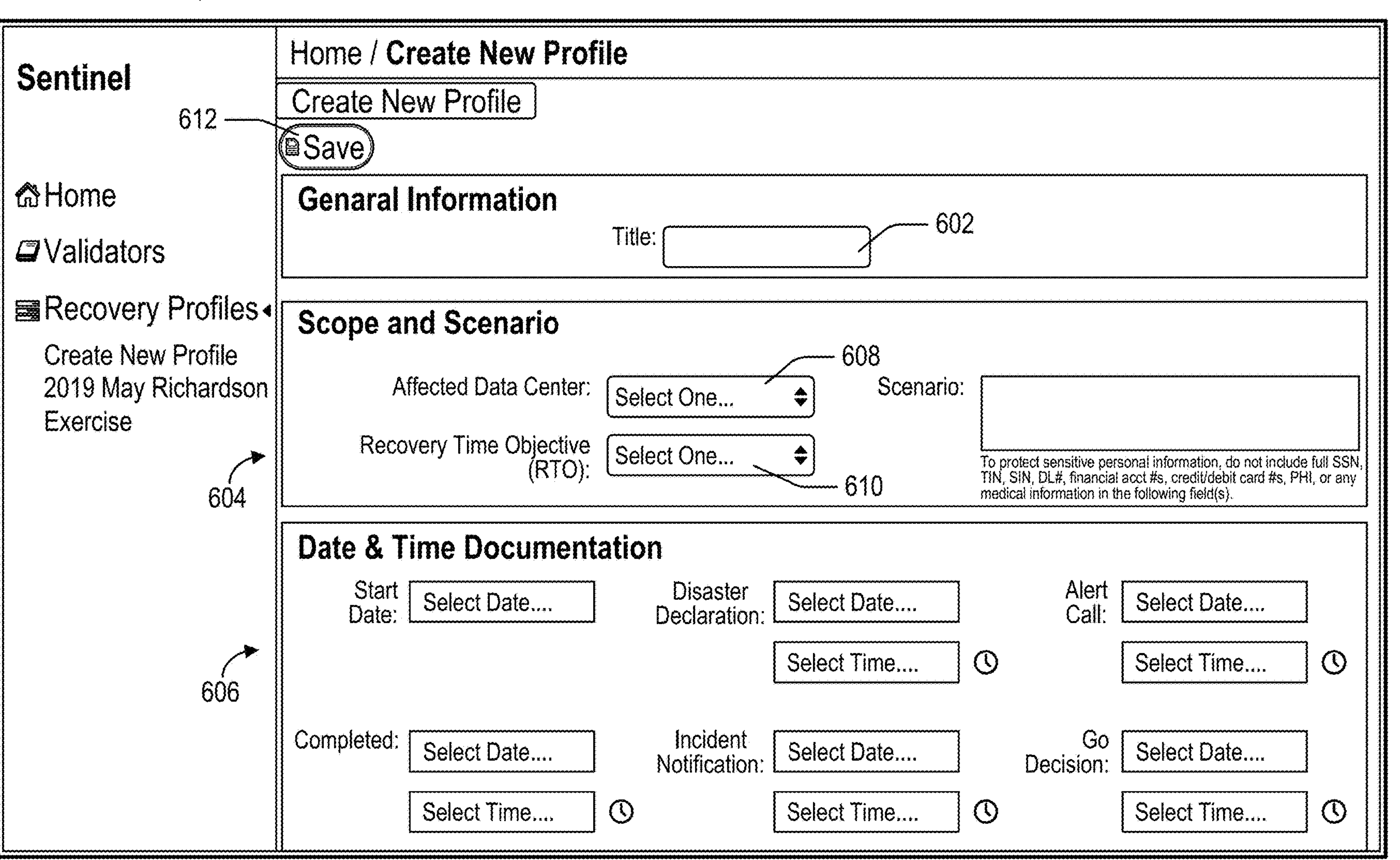
FIG. 6 depicts a fifth example of a user interface associated with creating a recovery profile for a validation test, in accordance with examples of the disclosure.

FIG. 6 depicts a fifth example of a user interface 600 associated with creating a recovery profile for a validation test, in accordance with examples of the disclosure. According to some examples, an STO may utilize a recovery profile to organize information associated with an exercise that simulates failure of one or more server activities or functions. A recovery profile may include one, or multiple, validation tests, where each validation test may include one or multiple commands. In some cases, the validation component 104 may require that a user account associated with an STO have specific access privileges to create, view, edit, and/or execute a recovery profile having validation tests associated with different teams.

For example, the user interface 600 includes a field 602 that enables an STO to input a title for the recovery profile, a portion 604 that enables the STO to define a scope associated with the recovery profile, and a portion 606 that enables the STO to document events during an exercise associated with the recovery profile. The portion 604 includes a menu 608 that enables the STO to select one or more data centers (e.g., the data center 108, the data center 112, etc.) that will participate in the recovery exercise. The portion 604 also includes a menu 610 that enables the STO to select a recovery time objective for individual teams affected by the recovery exercise have to checkout regarding whether the server computing devices the teams are responsible for passed the validation tests in the recovery exercise. As shown, the portion 606 includes fields that enable the STO to enter information associated with a start date of the recovery profile, a completed date and time for the recovery profile, a disaster declaration date and time associated with the recovery profile, an incident notification date and time associated with the recovery profile, an alert call date and time associated with the recovery profile, and a go decision date and time associated with the recovery profile. The user interface 600 also includes a control 612 that, when selected, causes the recovery profile to be saved, and subsequently available for access and execution on the selected computing devices enumerated in the recovery profile.

Although not explicitly pictured, the user interface 600 may include scope information for a recovery profile being viewed in the user interface 600, such as what data is being recovered as part of the validation test. Additionally, in some cases, the user interface 600 may include a progress dashboard when a recovery profile is being executed, which may include information such as data that has been recovered as part of the recovery profile, check-outs performed by an STO during the recovery profile, application checkouts occurring during the recovery profile, business process checkouts occurring during the recovery profile, and the like.

Figure 7:
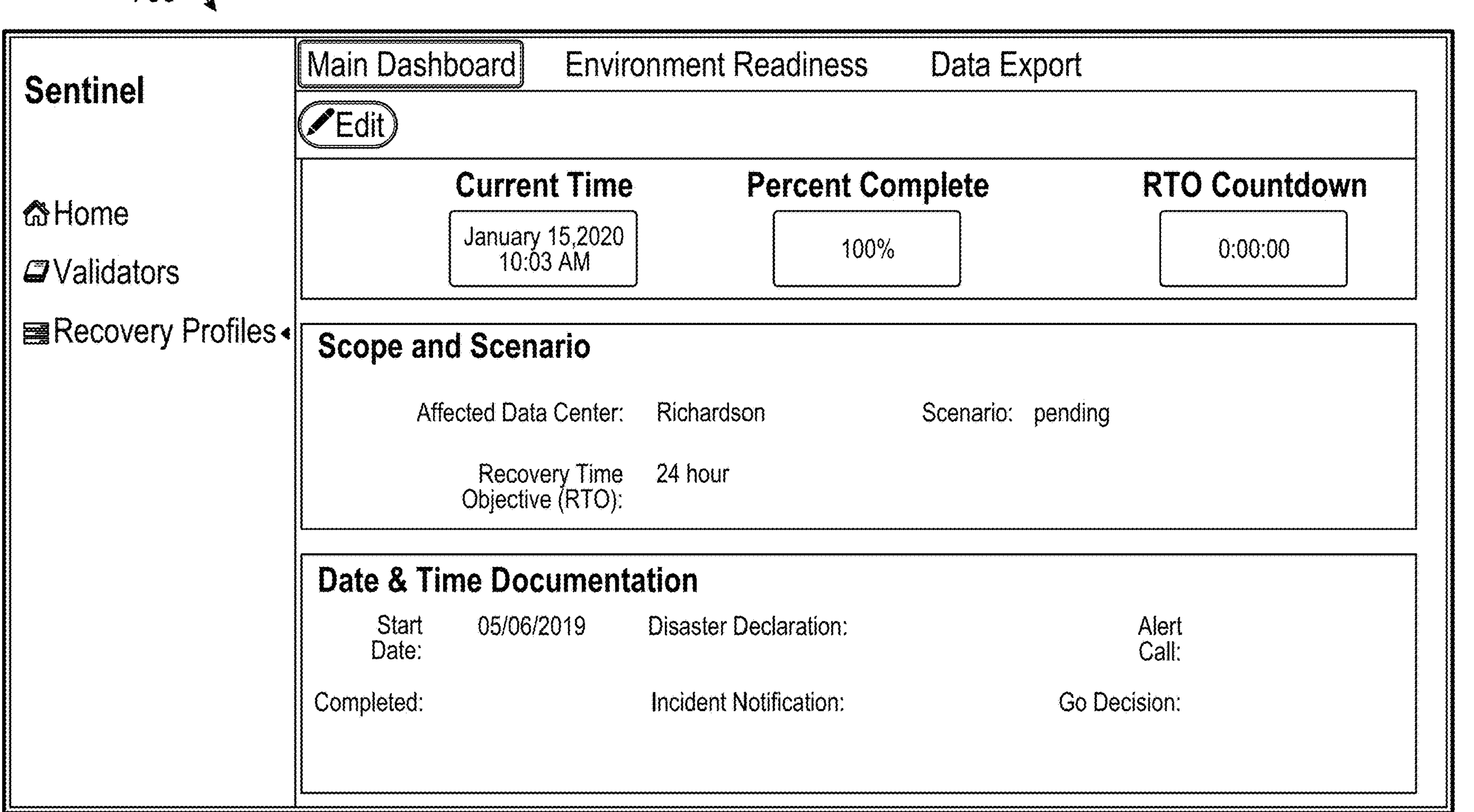
FIG. 7 depicts a sixth example of a user interface corresponding to a technical recovery exercise that includes a validation test, in accordance with examples of the disclosure.

FIG. 7 depicts a sixth example of a user interface 700 corresponding to a technical recovery exercise that includes a validation test, in accordance with examples of the disclosure. For instance, the validation component 104 provides the user interface 700 in response to receiving a selection of the control 612 to save a recovery profile, as described in relation to FIG. 6. The user interface 700 includes information corresponding to inputs received from the STO in the portion 604 that define the scope associated with the recovery profile, and the portion 606 that documents events during an exercise associated with the recovery profile.

Figure 8:
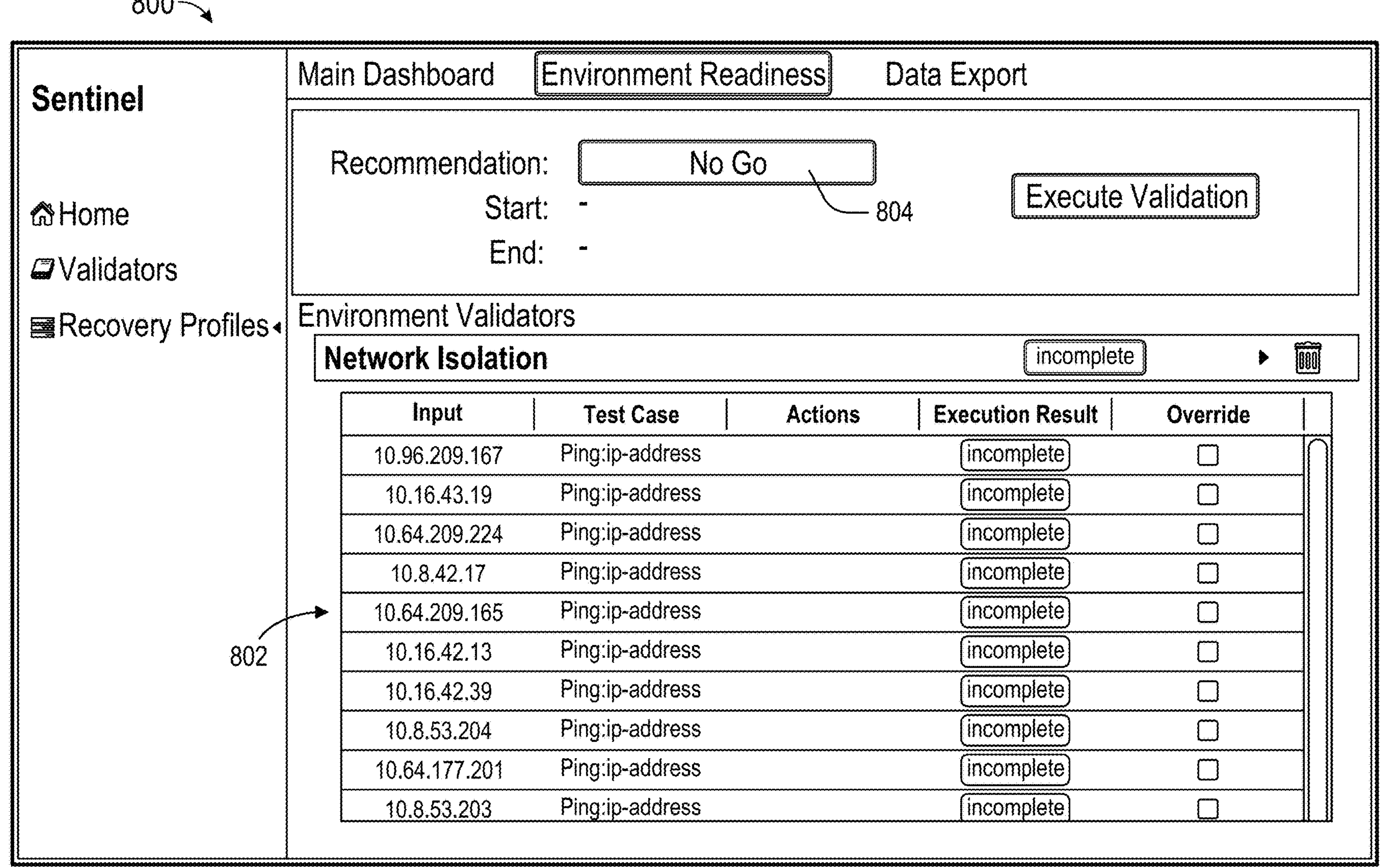
FIG. 8 depicts a seventh example of a user interface corresponding to environmental readiness for executing a validation test as part of a recovery profile, in accordance with examples of the disclosure.

FIG. 8 depicts a seventh example of a user interface 800 corresponding to environmental readiness for executing a validation test as part of a recovery profile, in accordance with examples of the disclosure. For example, an STO may execute a recovery profile to determine whether activities associated with data backup and verification of the data backup are working according to a standard, before a server failure occurs. In this way, the STO can determine whether an environment is prepared to handle a failure event, including time constraints for verifying that data has been backed up should a failure event occur.

The user interface 800 includes a list 802 enumerating each of the results corresponding to the commands included in a validation test executed by the validation component 104 and/or the execution component 116. In some examples, the reporting component 106 is configured to determine a recommendation 804 (e.g., "Go," "No Go," etc.) on whether the environment is safe to begin a recovery profile exercise. For instance, if a ping IP address command is incomplete (as illustrated in the user interface 800), then the reporting component 106 provides a "No Go" recommendation 804 indicating that it is not safe to proceed with executing a recovery profile exercise.

Figure 9:
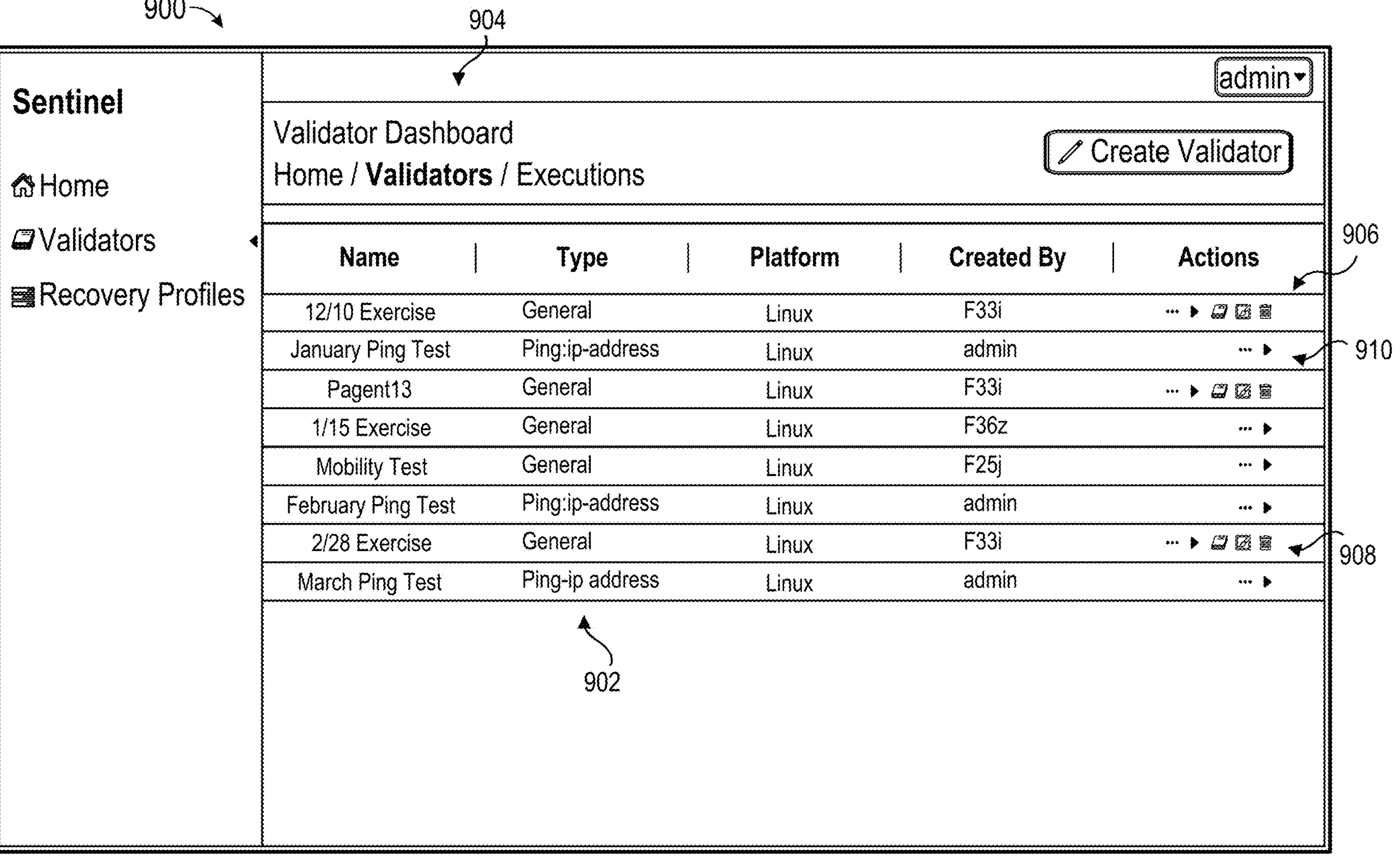
FIG. 9 depicts an eighth example of a user interface associated with a validator dashboard, in accordance with examples of the disclosure.

FIG. 9 is an eighth example user interface 900 associated with a validator dashboard 902. For example, the validator dashboard 902 may be a user interface provided by the validator component 104 at the computing device 102. The user interface 900 includes validation tests 904 that were previously generated by an STO, or other user. In some examples, the validation tests 904 provided by the user interface 900 may include validation tests 904 that an STO associated with the user interface 900 (e.g., F33i) has permissions to view and/or perform. In some examples, the permissions may include a permission level of a user account associated with the STO. In some examples, the permissions may be associated with a team or group association of the STO, such as that stored in association with an associated user account. For example, the validation tests 904 displayed in the user interface 900 may include validation tests created by the STO (e.g., F33i) and team members associated with the STO (e.g., F36z, F25j, admin, etc.).

In various examples, the user interface 900 includes controls 906 that, when selected, enable the STO to perform various actions (e.g., functions) with regard to a particular validation test. As discussed above, the controls 906 may include controls that enable the user to view additional details of the associated validation test, to run or execute the associated validation test, to view prior results of an associated validation test, to edit the associated validation test, and/or to delete the associated validation test.

In various examples, the number and type of controls 906 associated with a particular validation test may be determined based on permissions associated with the user account corresponding to the STO. In some examples, the number and type of controls 906 may be determined based on an STO associated with validation test creation. For example, a first set of controls 908 associated with a first validation test created by the logged in STO (e.g., F33i) may include controls to view additional details, run, view prior results, edit, and delete a first validation test, while a second set of controls 910 associated with a second validation test created by another user (e.g., admin) may include controls to view additional details and run the second validation test. Though this is merely an example, and the first set of controls and/or the second set of controls may include additional or alternative controls.

Figure 10:
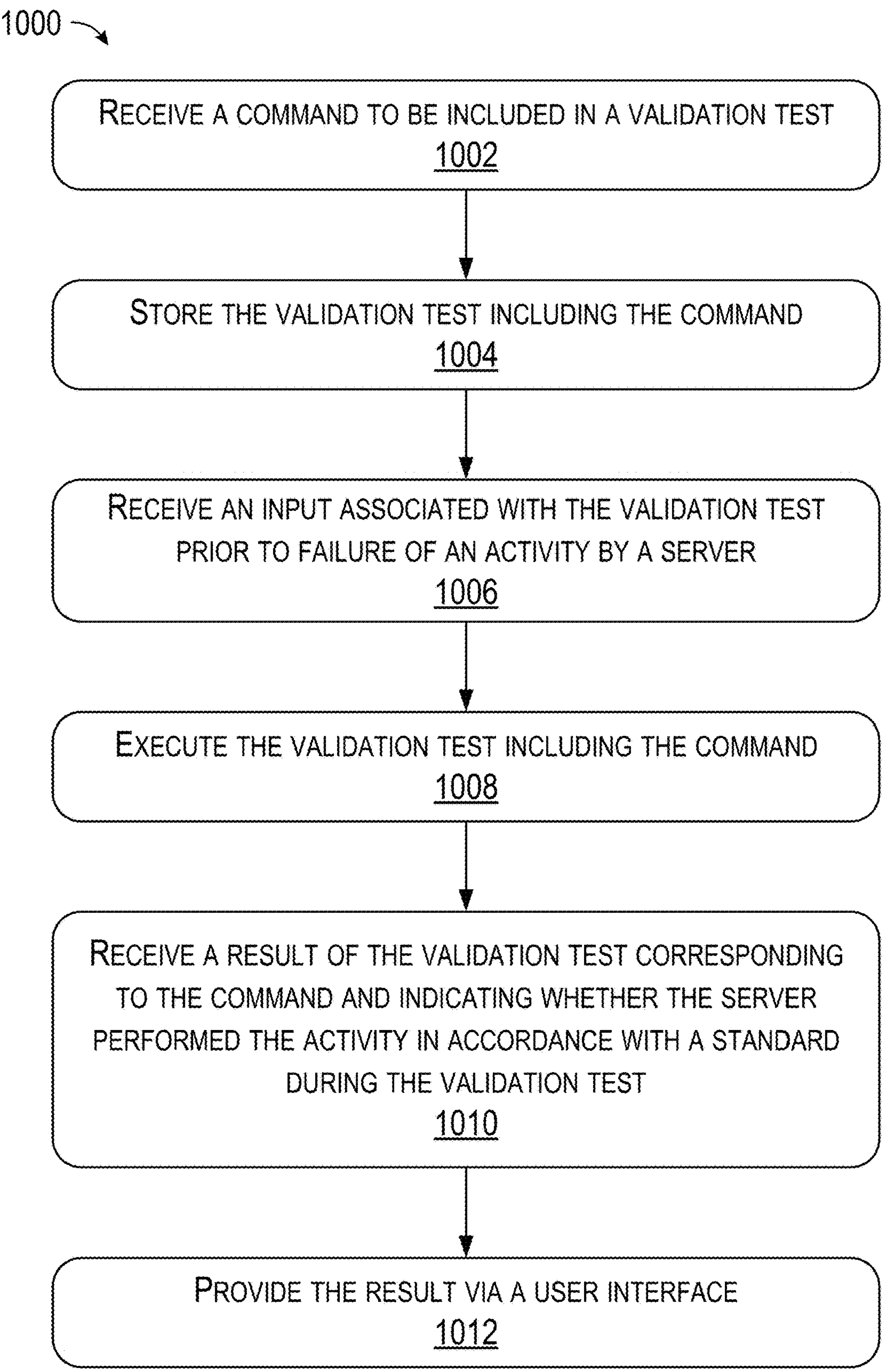
FIG. 10 is a flow chart depicting a method of storing a command in association with a validation test prior to a server failure, executing the validation test including the command, and providing a result of the validation test, in accordance with an example of the present disclosure.

FIG. 10 is a flow chart depicting a method 900 of storing a command in association with a validation test prior to a server failure, executing the validation test including the command, and providing a result of the validation test, in accordance with an example of the present disclosure. In some examples, the method 900 may be performed by one or more processors of computing devices, such as the computing device 102 of FIG. 1.

An operation 1002 includes receiving, by a processor, a command to be included in a validation test. In examples, the validation test is configured to validate performance of an activity by the server computing device 110 and/or the server computing device 114, prior to a failure of the server computing device 110 and/or the server computing device 114 to perform the activity. The command may include, for example, a socket connection check, ping by IP address, ping by hostname, file directory check, nslookup, environment variable check, remote script, file content check, URL check, database check, reverse DNS check, and so forth. Multiple commands may be included in a validation test. In some cases, the validation test may also include a scope of devices on which the validation test is to be performed, such as based on one or more of a business process, a geographic location of a data center, an operating system, and/or an asset type.

An operation 1004 includes storing, by the processor and in a memory device, the validation test including the command. Storing the validation test including the command enables an STO to use, re-use, modify, etc. one or more commands included in the validation test subsequent to the validation test being created and prior to a failure of the server computing device 110 and/or the server computing device 114. Thus, commands stored as part of a particular validation test on the memory device 120 may be preselected when the STO determines an appropriate time to run the validation test. Additionally, in some cases, the validation component 104 receives an edit to a command included in the validation test stored on the memory device 120, and updates and stores the command accordingly for subsequent execution.

An operation 1006 includes receiving, by the processor, an input associated with the validation test prior to failure of an activity by a server. For example, the validation component 104 may receive an input at a user interface indicating a request to execute a validation test stored on the memory device 120.

An operation 1008 includes executing, by the processor, the validation test including the command. In some examples, the validation component 104 transmits the validation test to the test execution component 116 via the network 118 according to which server computing devices are designated to execute the validation test. For instance, the validation component 104 determines which server computing devices are to execute the validation test based on a scope provided by an STO, and transmits the validation test to the respective server computing devices accordingly.

An operation 1010 includes receiving, by the processor, a result of the validation test corresponding to the command and indicating whether the server performed the activity in accordance with a standard during the validation test. In some examples, the reporting component 106 receives result of the validation test from the test execution component 116 in real time (or near real time) as the validation test is executed. Alternatively or additionally, the test execution component 116 may compile the results corresponding to individual commands included in the validation test, and transmit the results to the reporting component 106 once the validation test is complete.

An operation 1012 includes providing, by the processor, the result via a user interface. In examples where the test execution component 116 comprises real-time reporting functionality as described above, the reporting component 106 may provide the user interface including the real time results as the validation test takes place. Alternatively or additionally, the reporting component 106 may provide the user interface when the validation test is complete. For instance, the reporting component 106 may provide aggregate statistics and/or trends associated with the command(s) included in the validation test, as described above.

Figure 11:
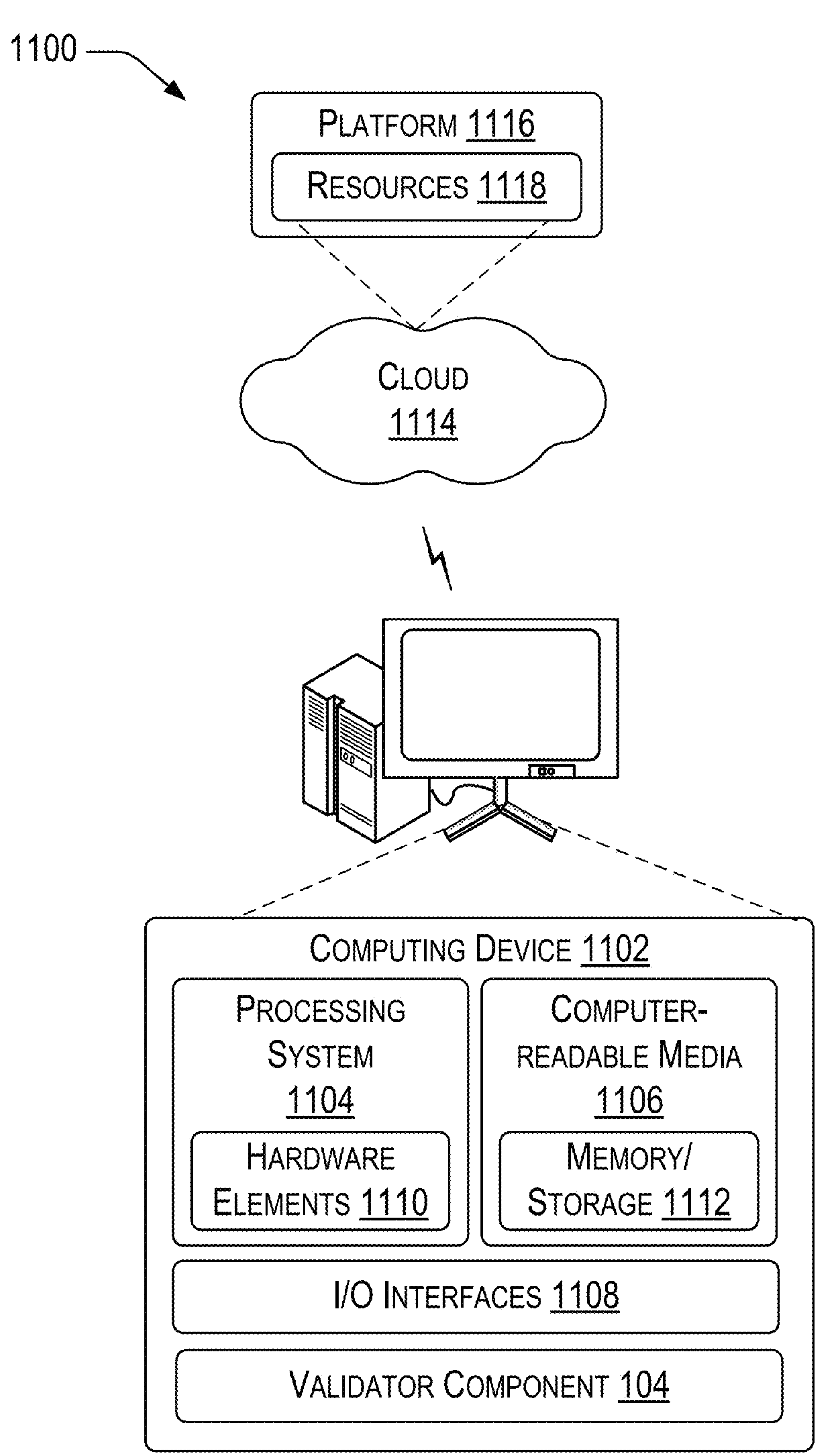
FIG. 11 depicts an example system architecture for a computing device in accordance with various examples.

FIG. 11 illustrates an example system generally at 1100 that includes an example computing device 1102 that is representative of one or more computing systems and/or devices that may implement the various techniques described herein. This is illustrated through inclusion of the validator component 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1004 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 1102. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 1102, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 1110 and computer-readable media 1106 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also be scalable to provide a corresponding level of scale to encountered demand for the resources 1118 that are implemented via the platform 1116. Accordingly, in an interconnected device embodiment, implementation of functionality described herein may be distributed throughout multiple devices of the system 1100. For example, the functionality may be implemented in part on the computing device 1102 as well as via the platform 1116 which may represent a cloud computing environment 1114.

The example systems and methods of the present disclosure overcome various deficiencies of known prior art devices. Other embodiments of the present disclosure will be apparent to those skilled in the art from consideration of the specification and practice of the disclosure contained herein. It is intended that the specification and examples be considered as example only, with a true scope and spirit of the present disclosure being indicated by the following claims.

Technological Improvements

This disclosure is directed to a data recovery validation testing system. The data recovery validation testing system described herein may enable a user to generate a validation test for evaluating performance of a plurality of servers in performing select (designated) functions. Implementations of the techniques and systems described herein can improve existing technologies (e.g., data recovery validation testing technologies), and can improve the functioning of the systems with respect to conventional systems. In existing systems, a server type owner (STO) manually inputs an instruction to test a server, such as to validate proper function thereof. Unlike the existing systems, the techniques described herein enable the STO to generate a validation test for testing a plurality of servers in performing one or more functions. The STO may input a request to run the validation test on the plurality of servers, and the data recovery validation testing system described herein may automatically evaluate each of the plurality of servers included in the validation test. By testing multiple servers automatically and at once, in lieu of manually initiating a test on individual servers, the techniques described herein greatly reduce the time and processing power required evaluate the plurality of servers. In other words, instead of processing individual commands to evaluate a server, the data recovery validation testing system may receive a validation test that includes instructions to test the plurality of servers. Accordingly, the techniques described herein may reduce an amount of processing power required to test the plurality of servers. Additionally, the techniques described herein may reduce an amount of bandwidth required to evaluate the plurality of servers by providing the instruction in a single validation test in lieu of sending each instruction individually.

Additionally, the data recovery validation testing system described herein improves the functioning of an associated computing device. In the traditional systems described above, the manual process to generate a validation test for a single server could take approximately 3-5 minutes of time processing data, inputting data, generating the validation test for a single server, etc. In contrast, the system described herein can generate the validation test for a plurality of servers at once, thereby saving countless man-hours. For example, an STO may generate a validation test and may input a file including an identification of 150 servers to be tested. By uploading data associated with the 150 servers into the validation test, the techniques described herein can save upwards of 450 man-hours. The reduction in time required to generate the validation test for the plurality of servers renders additional computing resources available for other functions of the computing device (e.g., increased processing power, etc.). Additionally, the reduction in time associated with each validation test directly results in a decreased amount of connectivity time and network communications between the computing devices associated with the data recovery validation testing. The reduction in network communications may result in a reduction in amount of network bandwidth required to evaluate the performance of a plurality of servers. Accordingly, the techniques described herein increase an amount of network bandwidth available for other network traffic.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program components can be located in both local and remote memory storage devices.

What is claimed is:

1. A method, comprising:

receiving, by a computing device, a request to access a recovery profile comprising validation tests associated with one or more servers;

determining, by the computing device and based on the request, that a user account associated with the computing device has permission to access the recovery profile;

receiving, by the computing device, information indicating:

an exercise to perform in association with the validation tests, and a server, of the one or more servers, on which to execute a portion of the validation tests, wherein the portion of the validation tests is configured to validate performance of an activity by the server;

causing, by the computing device and based on the information, the server to execute the portion of the validation tests, wherein execution of the portion of the validation tests causes the server to generate a result indicating whether the server performed the activity, in accordance with a standard associated with the activity, during the execution of the portion of the validation tests;

determining, by the computing device and based on the result, a recommendation indicating whether an environment associated with the one or more servers is safe to perform the exercise; and outputting, by the computing device and to a user interface of the computing device or to an additional computing device associated with another user account, the recommendation.

2. The method of claim 1, further comprising:

providing, by the computing device and via the user interface of the computing device, or to the additional computing device, the result.

3. The method of claim 2, wherein the result comprises at least one of:

an indicator of progress associated with the portion of the validation tests, data recovered in association with the recovery profile, or actions performed in association with the activity.

4. The method of claim 1, further comprising:

causing, by the computing device, multiple servers of the one or more servers to execute the portion of the validation tests;

generating, by the computing device, aggregate statistics associated with the multiple servers on which the portion of the validation tests are executed; and providing, by the computing device, the aggregate statistics to the computing device or to the additional computing device.

5. The method of claim 1, further comprising:

storing, by the computing device, the result or the recommendation in association with the recovery profile.

6. The method of claim 1, wherein the information further comprises one or more of:

a recovery time objective, a start date of the recovery profile, a completed date and a completion time for the recovery profile, a disaster declaration date and a disaster declaration time associated with the recovery profile, an incident notification date and an incident notification time associated with the recovery profile, an alert call date and an alert call date time associated with the recovery profile, or a go decision date and time associated with the recovery profile.

7. The method of claim 1, wherein the result comprises a list indicating success or failure of each command included in each of the validation tests in association with the server.

8. The method of claim 1, wherein the activity simulates a failure of one or more server activities or one or more server functions.

9. The method of claim 1, wherein each validation test in the portion of the validation tests includes at least one command, the at least one command comprising one or more of:

a socket connection check, a ping by IP address check, a ping by hostname check, a file directory check, an nslookup check, an environment variable check, a remote script check, a file content check, a URL check, a database check, or a reverse DNS check.

10. The method of claim 1, further comprising:

determining, by the computing device and based on the request, one or more commands to be included in the portion of the validation tests; and storing, by the computing device, the one or more commands in association with the activity, wherein the stored one or more commands is retrievable to enable a future request to validate the activity.

11. The method of claim 1, further comprising:

determining, by the computing device and based on the recovery profile, a group associated with the one or more servers;

determining, by the computing device, an additional server that is associated with the group; and causing, by the computing device, the additional server to execute the portion of the validation tests, wherein the result indicates whether the additional server performed the activity.

12. A system, comprising:

a processor; and computer-readable media storing instructions that, when executed by the processor, cause the processor to perform operations comprising:

receiving a request to access a recovery profile comprising validation tests associated with one or more servers;

determining, based on the request, that a user account associated with the processor has permission to access the recovery profile;

receiving information indicating:

an exercise to perform in association with the validation tests, and a server, of the one or more servers, on which to execute a portion of the validation tests;

causing, based on the information, the server to execute the portion of the validation tests, wherein execution of the portion of the validation tests causes the server to generate a result indicating whether the server performed an activity, in accordance with a standard associated with the activity;

determining, based on the result, a recommendation indicating whether an environment associated with the one or more servers is safe to perform the exercise; and outputting, to a user interface accessible to the processor or to a computing device associated with another user account, the recommendation.

13. The system of claim 12, wherein the portion of the validation tests are configured to validate performance of the activity by the server.

14. The system of claim 12, wherein each validation test in the portion of the validation tests includes at least one command, the at least one command comprising a socket connection check, a ping by IP address check, a ping by hostname check, a file directory check, an nslookup check, an environment variable check, a remote script, a file content check, a URL check, a database check, or a reverse DNS check.

15. The system of claim 12, wherein the information further comprises one or more of:

a recovery time objective, a start date of the recovery profile, a completed date and a completion time for the recovery profile, a disaster declaration date and a disaster declaration time associated with the recovery profile, an incident notification date and an incident notification time associated with the recovery profile, an alert call date and an alert call date time associated with the recovery profile, or a go decision date and a go decision time associated with the recovery profile.

16. The system of claim 12, the operations further comprising:

causing multiple servers of the one or more servers to execute the portion of the validation tests;

generating aggregate statistics associated with the multiple servers on which the portion of the validation tests are executed; and providing the aggregate statistics to the computing device or to the computing device.

17. One or more non-transitory computer-readable media storing instructions that, when executed by one or more processors, cause the one or more processors to perform operations comprising:

receiving a request to access a recovery profile comprising validation tests associated with one or more servers;

determining, based on the request, that a user account has permission to access the recovery profile;

receiving information indicating:

an exercise to perform in association with the validation tests, and a server on which to execute a portion of the validation tests;

causing, based on the information, the server to execute the portion of the validation tests, wherein execution of the portion of the validation tests causes the server to generate a result indicating whether the server performed an activity, in accordance with a standard associated with the activity, during the execution of the portion of the validation tests;

determining, based on the result, a recommendation indicating whether an environment associated with the one or more servers is safe to perform the exercise; and outputting, to a user interface operably connected to the one or more processors, or to a computing device associated with another user account, the recommendation.

18. The one or more non-transitory computer-readable media of claim 17, wherein the result comprises a list indicating success or failure of each command included in each validation test of the portion of the validation tests performed by the server.

19. The one or more non-transitory computer-readable media of claim 18, wherein the result further comprises one or more of:

an indicator of progress associated with the portion of the validation tests, data recovered in association with the recovery profile, and actions performed in association with the activity.

20. The one or more non-transitory computer-readable media of claim 17, wherein the information further comprises one or more of a recovery time objective, a start date of the recovery profile, a completed date and a completion time for the recovery profile, a disaster declaration date and a disaster declaration time associated with the recovery profile, an incident notification date and an incident notification time associated with the recovery profile, an alert call date and an alert call date time associated with the recovery profile, or a go decision date and time associated with the recovery profile.

* * * * *